(12) United States Patent
Ticknor

(10) Patent No.: US 6,795,600 B1
(45) Date of Patent: Sep. 21, 2004

(54) WAVEPLATE FOR OPTICAL INTEGRATED CIRCUITS AND METHODS FOR MANUFACTURING THE SAME

(75) Inventor: Anthony J. Ticknor, Cupertino, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 127 days.

(21) Appl. No.: 09/916,073

(22) Filed: Jul. 26, 2001

(51) Int. Cl.$^7$ ................................................ G02B 6/12
(52) U.S. Cl. ........................................................ 385/14
(58) Field of Search .................... 385/14, 11, 129–131, 385/140, 37

(56) References Cited

U.S. PATENT DOCUMENTS

| | | | |
|---|---|---|---|
| 5,499,307 A | 3/1996 | Iwatsuka | 385/11 |
| 5,546,483 A | 8/1996 | Inoue et al. | 385/14 |
| 5,694,496 A | 12/1997 | Ando et al. | 385/11 |
| 5,898,804 A | 4/1999 | Wickham | 385/37 |
| 5,930,422 A | 7/1999 | Cheng | 385/47 |
| 6,115,514 A | 9/2000 | Ando et al. | 385/11 |
| 6,169,828 B1 | 1/2001 | Cao | 385/31 |
| 6,585,382 B1 * | 7/2003 | Stone | 359/839 |

FOREIGN PATENT DOCUMENTS

| | | |
|---|---|---|
| EP | 0818695 | 1/1998 |
| EP | 1118888 | 7/2001 |
| JP | 11119158 | 4/1999 |

OTHER PUBLICATIONS

Sugimoto, et al., "Waveguide Polarization–Independent Optical Circulator," IEEE Photonics Technology Letters, vol. 11, No. 3, Mar. 1999, p. 355–357.
Inoue T., et al., "Polarization Mode Converter With Polyimide Half Waveplate in Silica–Based Planar Lightwave Circuits," IEEE Photonics Technology Letters, vol. 6, No. 5, May 1994, pp 626–628.

* cited by examiner

Primary Examiner—Javaid H. Nasri
(74) Attorney, Agent, or Firm—Amin & Turocy, LLP

(57) ABSTRACT

Optical circuits are disclosed having a waveplate intersecting curvilinear optical waveguides in order to mitigate polarization dependence. The waveplate is offset from the center or midpoint of the waveguides such that the intersections of the waveplate with the waveguides result in little or no back-reflection, while also providing polarization independent operation. Also disclosed are methods for fabricating optical integrated circuits.

22 Claims, 3 Drawing Sheets

WAVEPLATE FOR OPTICAL INTEGRATED CIRCUITS AND METHODS FOR MANUFACTURING THE SAME

TECHNICAL FIELD

The present invention relates to the art of optical integrated circuits and more particularly to apparatus and methods for mitigating polarization dependence in optical integrated circuits.

BACKGROUND OF THE INVENTION

Optical integrated circuits (OICs) come in many forms such as 1×N optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs typically comprise optical paths known as waveguides formed on a silicon wafer substrate using lithographic processing, wherein the waveguides are made from transmissive media including lithium niobate ($LiNbO_3$) or other inorganic crystals, silica, glass, thermo-optic polymers, electro-optic polymers, and semiconductors such as indium phosphide (InP), which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. For example, early systems provided four different wavelengths separated by 400 GHz, wherein each wavelength transferred data at 2.5 Gbits per second. Current multiplexed optical systems employ as many as 80 wavelengths, and systems are contemplated having more than 160 wavelength channels with 50 GHz spacing, carrying data at 10 Gbits per second in each channel.

In order to provide advanced multiplexing and demultiplexing (e.g., DWDM) and other functions in such networks, arrayed-waveguide gratings (AWGs) have been developed in the form of PLCs. Existing AWGs typically provide multiplexing or demultiplexing of 40 channels or wavelengths spaced at 100 GHz, and AWGs are contemplated to accommodate 128 wavelengths spaced at 25 GHz. As illustrated in FIG. 1, a conventional demultiplexing AWG 2 includes a base 4, such as a silicon substrate, with a single input port 6, and multiple output ports 8. Multiple wavelength light is received at the input port 6 (e.g., from an optical fiber in a network, not shown) and provided to an input lens 10 via an input optical path or waveguide 12 in the substrate base 4.

The input lens 10 spreads the multiple wavelength light into an array of waveguides 14, sometimes referred to as arrayed-waveguide grating arms. Each of the waveguides or arms 14 has a different optical path length from the input lens 10 to an output lens 16, resulting in a different phase tilt at the input to the lens 16 depending on wavelength. This phase tilt, in turn, affects how the light recombines in the output lens 16 through constructive interference. The lens 16 thus provides different wavelengths at the output ports 8 via individual output waveguides 18, whereby the AWG 2 can be employed in demultiplexing light signals entering the input port 6 into two or more demultiplexed signals at the output port 8. The AWG 2 can alternatively be used to multiplex light signals from the ports 8 into a multiplexed signal having two or more wavelength components at the port 6.

A problem with the AWG 2 of FIG. 1 is polarization dependence of the waveguides 14, caused by waveguide birefringence. Waveguide birefringence is experienced in varying degrees with waveguides fabricated from the above-mentioned materials. For example, where the waveguides 14 are formed by depositing a glass film on a silicon substrate, the difference in thermal expansion coefficient between the glass film and the silicon substrate base 4 causes stress applied on the waveguides 14 in a direction parallel to the surface to be different from that in a perpendicular direction.

Waveguide birefringence results, wherein the refractive index of the waveguides 14 in the direction parallel to the substrate surface becomes different from that in the perpendicular direction. The birefringence, in turn, causes polarization dependence in the waveguides 14, where the optical path length difference (e.g., between adjacent waveguides 14) changes depending on the polarizing direction of light. In this situation, shifts occur between the transverse electric (TE) and transverse magnetic (TM) mode peaks, where the shift changes according to polarization. Consequently, the device characteristics change in accordance with the polarized state of the light provided to the device 2. For instance, the peak coupling in a particular channel or waveguide 14 can vary according to the polarities of the various wavelength components, causing polarization dependent wavelength (PDW) shift.

Referring to FIG. 2, this polarization sensitivity or dependence in AWGs and other dispersive components has been heretofore addressed by bisecting the waveguides 14 and placing a waveplate, such as a half-waveplate 20, in a slot 21 between waveguide portions 22 and 24. Thus located, the waveplate 20 reduces or eliminates polarization dependence in the AWG 2. In particular, it has been found that the waveplate 20 causes polarization swapping partway along the optical paths of the bisected waveguides 14, such that any input polarization samples each propagation constant equally and provides essentially no shift in peak-wavelength with changes in input polarization. Thus, the spectrum for the TE and TM modes coincide through the use of the waveplate 20. Conventionally, the waveplate 20 is placed at the precise center of the grating arms or waveguides 14 to eliminate the wavelength shift resulting from birefringence.

However, this waveplate location causes the interface between the waveplate 20 and the waveguide ends of portions 22 and 24 to be perpendicular or near perpendicular. As a result, a small fraction of the light propagating through the waveguide portions 22 may be reflected back toward the input lens 10, leading to unacceptably high back-reflection and directivity measurements Thus, although the convention use of the waveplate 20 reduces or eliminates the polarity sensitivity problems associated with waveguide birefringence, back-reflection is increased. Consequently, there remains a need for better solutions to polarity dependence in optical integrated circuits such as AWGs, which avoid or mitigate the back-reflection problems associated with the convention employment of waveplates in such devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides optical circuit apparatus and methods by which the polarization dependent wavelength shift can be mitigated while avoiding or mitigating the back-reflection shortcomings associated with conventional weaveplate uses in AWGs and other dispersive devices.

In one aspect of the invention, an optical integrated circuit is provided having a waveplate intersecting optical waveguides in order to mitigate polarization dependence. The waveplate, which may be a half-wave plate, is offset from the center or midpoint of the waveguides such that the intersections of the waveplate with the waveguides result in little or no reflection back along the incident waveguides. For example, the waveplate can be positioned so as to intersect the waveguides at an angle with respect to the waveguide axis.

In addition, it has been found that effective mitigation in polarization dependent wavelength shift (PDW) can be achieved where the spacing between the waveguide intersection and the centerpoint is generally the same or similar for the waveguides in an AWG or other dispersive device. Where the waveguides are curvilinear and symmetrical about the centerpoint (e.g., with the centerpoints lying generally along a line), the waveplate can be spaced from the centerpoints to intersect the waveguides along a second, nearly parallel, line according to the invention. Moreover, the spacing can be selected to provide for mitigation of back-reflection according to the curvilinear features of the waveguides.

Another aspect of the invention provides an arrayed-waveguide grating (AWG) device, which comprises a base with a plurality of optical paths extending through the base between first and second optical circuits (e.g., such as lenses or other optical devices). The optical paths, which can be waveguides formed on a PLC substrate, individually have midpoints centrally located between the first and second optical circuits, wherein the midpoints of the optical paths are generally located in a line. The AWG further comprises a half-wave plate spaced away from the line nominally equidistant along each optical path, intersecting each of the optical paths.

The half-wave plate operates to reduce polarization dependence of the AWG device, for example, by intersecting the optical paths at intersections spaced from the midpoints of the optical paths, wherein the intersections in each of the optical paths are generally equally spaced from the corresponding midpoints. In addition, the adverse effects of back-reflection can be reduced or mitigated, wherein the half-wave plate intersects the optical paths at an angle, which can be about 84 degrees or less.

Yet another aspect of the invention involves a method of manufacturing an optical integrated circuit, which comprises providing a base having one or more waveguides extending axially between first and second ends with a centerpoint centrally located between the first and second ends, and providing a waveplate in, the base intersecting the waveguides at an intersection spaced from the centerpoint. The waveplate can be located so as to intersect the waveguides at an angle of about 70 degrees or more and less than 90 degrees with respect to the waveguide axis, whereby back-reflection can be mitigated.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE INVENTION

Figure 3:
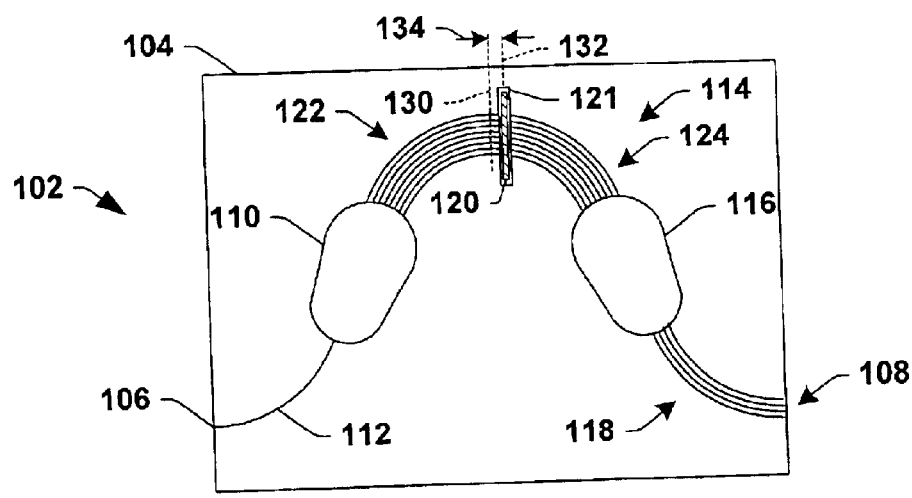
FIG. 3 is a schematic top plan view of an exemplary AWG optical integrated circuit having a waveplate spaced from the centerline of the waveguide array for mitigating polarity dependent wavelength shift in accordance with an aspect of the present invention.
Figure 4:
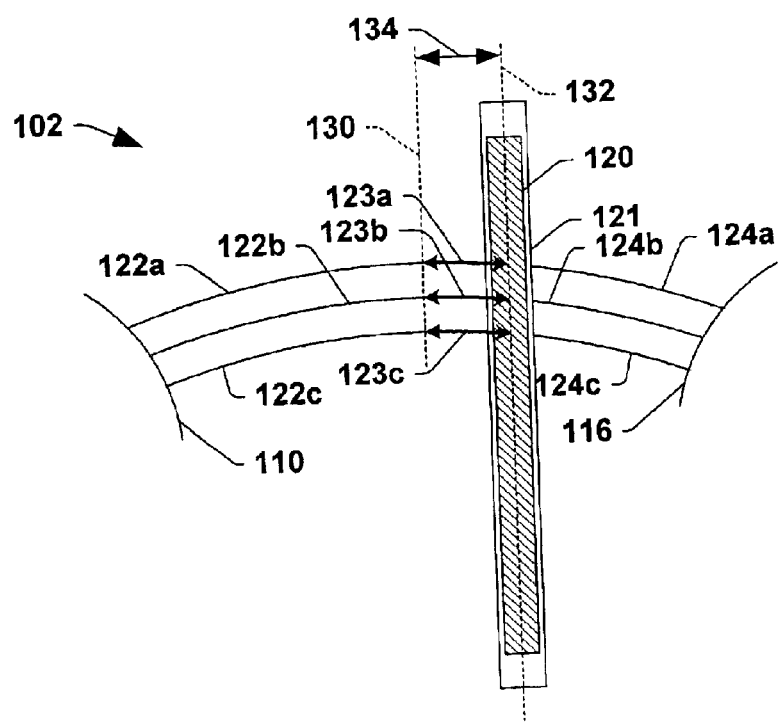
FIG. 4 is a partial top plan view of the AWG of FIG. 3, further illustrating the spacing of the waveplate from the centerline.
Figure 5:
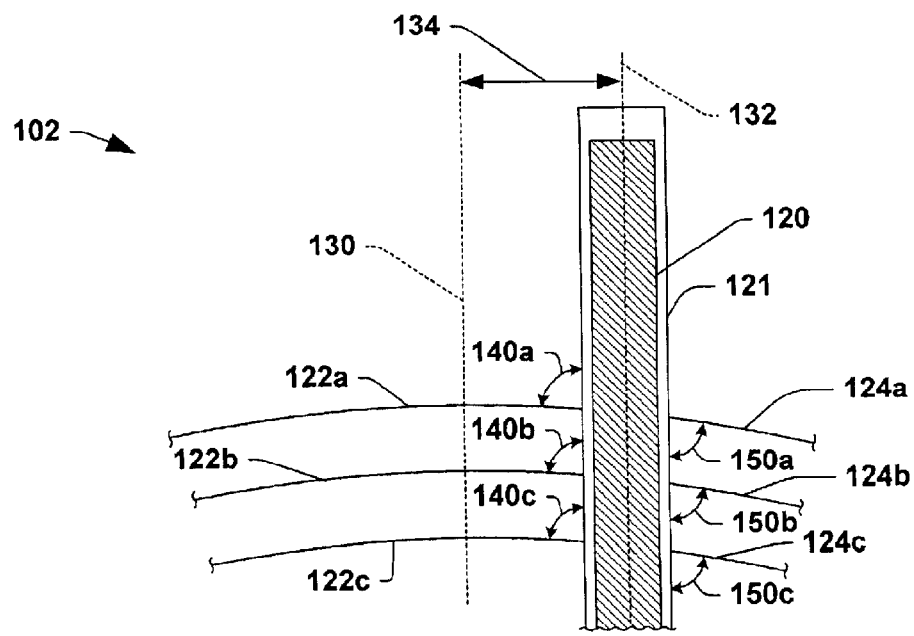
Figure 6:
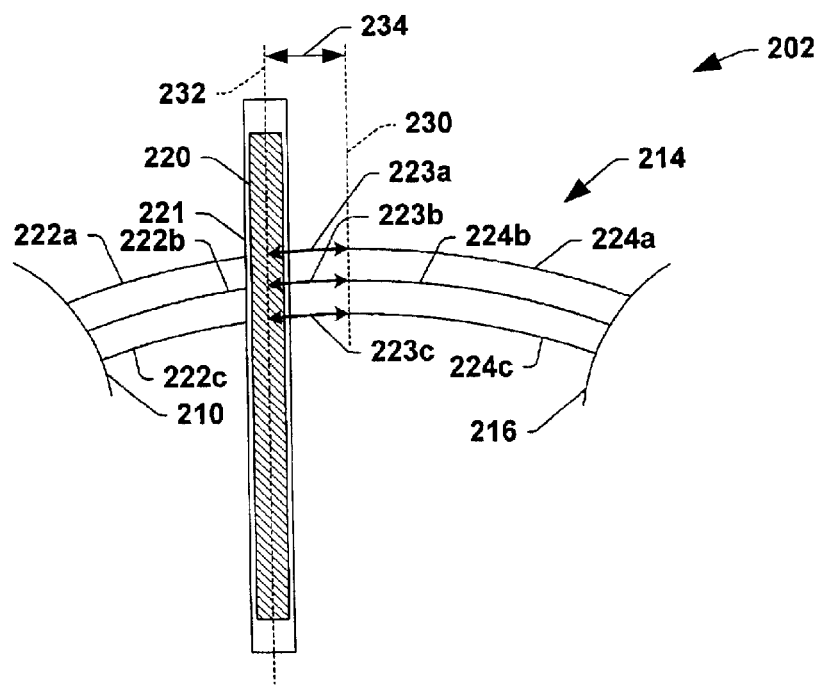

FIG. 5 is another partial top plan view of the AWG of FIGS. 3 and 4, illustrating the spacing of the waveplate from the centerline, and the angle of intersection with the waveguides; and FIG. 6 is a schematic partial top plan view of another exemplary AWG optical integrated circuit having a waveplate spaced from the centerline of the waveguide array for mitigating polarity dependent wavelength shift in accordance with another aspect of the invention.

DETAILED DESCRIPTION OF THE INVENTION

The various aspects of the present invention will now be described with reference to the drawings, wherein like reference numerals are used to refer to like elements throughout. The invention provides for mitigation of polarization dependency in AWGs and other dispersive optical devices, without causing back-reflection associated with conventional AWGs having waveplates, by locating a waveplate in a spaced relationship with respect to waveguide centerpoints in the device.

One exemplary implementation of the invention is illustrated in FIGS. 3–5, in which a PLC AWG 102 includes a base 104, such as a silicon substrate, with a single input port 106, and multiple output ports 108. Multiple wavelength light is received at the input port 106 (e.g., from an optical fiber in a network, not shown) and provided to an input lens or other type of optical component 110 via an input optical path or waveguide 112 in the substrate base 104. The input lens 110 spreads the multiple wavelength light into an array of waveguides 114. It will be noted at this point that waveplates may be located in accordance with the present invention, to intersect waveguides extending between any type of optical component or circuit, including but not limited to lenses, taps, and the like, as well as optical ports for providing light to or from the waveguide to external optical fibers.

Each of the waveguides 114 individually extend axially along different, generally curvilinear optical paths from the input lens 110 to an output lens 116, resulting in a different phase tilt at the input to the lens 116 depending on wavelength. This phase tilt, in turn, affects how the light recombines in the output lens 116 through constructive interference. The lens 116 thus provides different wavelengths at the output ports 108 via individual output waveguides 118, whereby the AWG 102 can be employed in demultiplexing light signals entering the input port 106 into two or more demultiplexed signals at the output port 108.

The AWG 102 can alternatively be used to multiplex light signals from the ports 108 into a multiplexed signal having two or more wavelength components at the port 106. Although illustrated with a single input waveguide 112 and eight output waveguides 118 associated with lenses 110 and 116, respectively, any number of such input and output waveguides 112 and 118 can be employed in accordance with the present invention. In addition, it will be appreciated that any appropriate number of waveguides 114 may be used in the AWG 102.

The midpoints of the waveguides 114 are located along a generally vertical centerline 130. The AWG 102 further comprises a waveplate 120 in a slot 121, wherein the waveplate 120 intersecting the waveguides 114 at intersections located generally along a second generally vertical line 132, wherein the second line 132 is generally parallel to and spaced from the centerline 130 by an offset distance 134. The offset distance 134 is about 10 μm or more and about 50 mm or less in one implementation. Other implementations are contemplated within the scope of the present invention, for example, wherein the offset distance 134 is about 100 μm or more and about 10 mm or less. In another implementation, the offset distance 134 is about 500 μm or more and about 2 mm or less.

The waveguides 114 thus comprise first portions 122 between the lens 110 and the waveplate 120, and second portions 124 between the waveplate 120 and the lens 116. As illustrated in FIG. 4, it has been found that mitigation of polarization dependent wavelength shift can be achieved where the spacings 123a, 123b, and 123c between the centerline 130 and the waveplate line 132 are generally the same along the waveguide portions 122a, 122b, and 122c, respectively. That is, spacings 123a, 123b, and 123c are within about 2% of each other in length.

Figure 1:
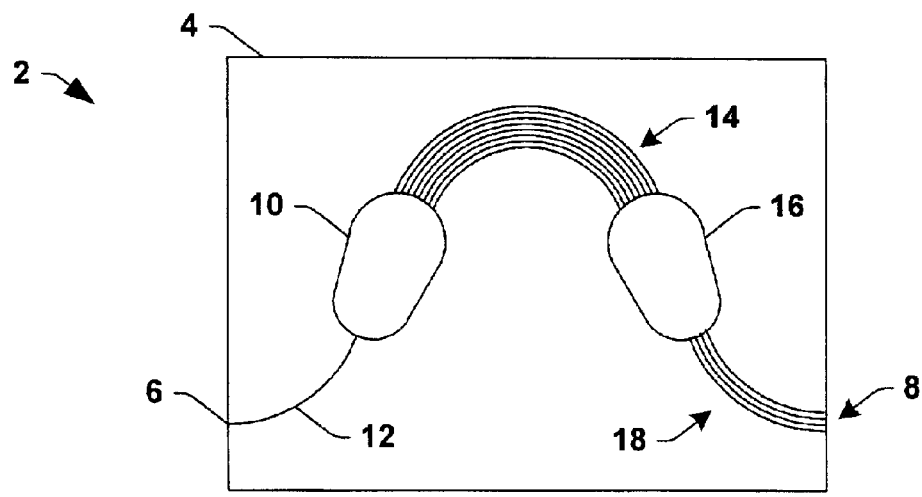
FIG. 1 is a schematic top plan view of a conventional arrayed-waveguide grating (AWG) multiplexer/demultiplexer device.
Figure 2:
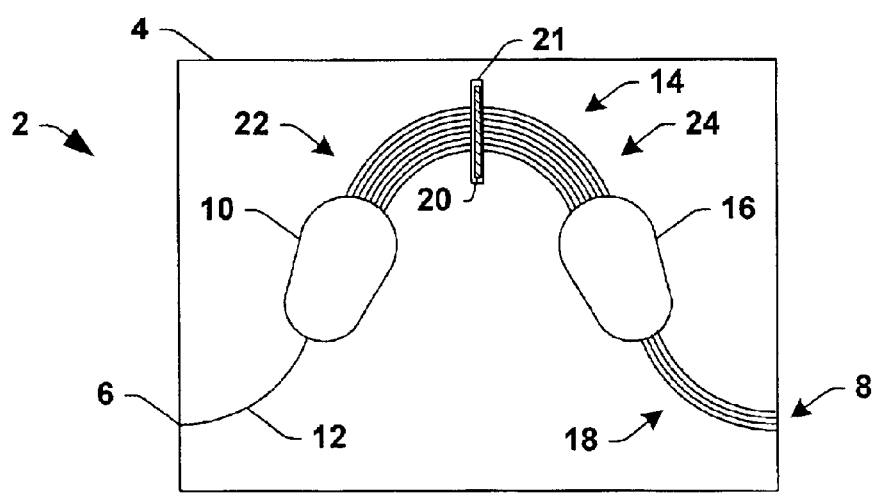
FIG. 2 is a schematic top plan view of the AWG device of FIG. 1, with a centrally positioned waveplate for reducing polarity dependent wavelength shift.

Referring also to FIG. 5, the deleterious effects of back-reflection can be mitigated through spacing the waveplate 120 from the centerline 130 by distance 134 along the waveplate line 132, whereby the curved axial paths of the waveguide portions 122a, 122b, and 122c are not perpendicular to the waveplate surface. Whereas conventional waveplate locations along the waveguide centerline (e.g., FIG. 2) result in intersection of the waveguides with the waveplate at approximately a 90 degree angle, the invention advantageously allows placement of the waveplate 120 (e.g., in spaced relationship to the centerline 130) such that the waveplate intersects the waveguides at any desired angle. For instance, in order to reduce or mitigate back-reflection, intersection angles 140a, 140b, and 140c may be set to about 70 degrees or more and less than 90 degrees with respect to the axis of the waveguides 122. In another embodiment, the intersection angles 140a, 140b, and 140c may be set to about 80 degrees or more and about 85 degrees or less with respect to the axis of the waveguides 122.

Thus, as illustrated in FIGS. 4 and 5, the offset distance 134 may be selected such that the spacings 123a, 123b and 123c are generally equal (e.g., to provide mitigation of polarization sensitivity in the operation of the AWG 102), and such that the intersection angles 140a, 140b, and 140c are sufficient to mitigate back-reflection. It will be noted at this point, that where the AWG 102 can be used as either a multiplexer or demultiplexer, the invention provides for mitigation of back-reflection and polarization dependence in either direction. For example, as illustrated in FIG. 5, the intersection angles 150a, 150b, and 150c can be set to be less than 90 degrees (e.g., such as about 84 degrees or less) via the spacing of the waveplate line 132 from the centerline 130 by the distance 134. Thus, back-reflection of light through the waveguide portions 124a, 124b, and 124c can be mitigated in accordance with the invention, while also providing polarization independent operation of the AWG 102.

Referring briefly to FIG. 6, the invention can be implemented in a variety of configurations Among these, the waveplate can be spaced from the waveguide centerline in either axial direction. For example, another AWG 202 is illustrated having waveguides 214 with first and second portions 222 and 224 extending between a first lens 210 and second lens 216. The centerpoints of the waveguides 214 lie along a centerline 230, and a waveplate 220 in a slot 221 intersects the waveguides 214 along a line 232 generally parallel to and spaced from centerline 230 by a distance 234, whereby the individual spacings 223a, 223b, and 223c of the waveguide/waveplate intersections from the waveguide centerpoints are generally the same (e.g., such as within about 2% of each other in length). It will be appreciated that the waveplate (e.g., waveplates 120, 220) can be located in the optical circuit in any fashion according to the invention, including but not limited to the use of a slot (e.g., slots 121, 221).

Other implementations are possible, wherein the waveplate intersects the waveguides at a distance from the waveguide centerline. For instance, non-symmetrical waveguides in an AWG or other optical integrated circuit can be intersected by a waveplate such that the intersection points are equally spaced from the centerpoints along each waveguide by a generally equal distance. Thus, the invention provides for mitigation of both polarization dependent wavelength shifting and back-reflection. It will be noted in the exemplary implementations illustrated in FIGS. 3–6, that the waveguide centerline (e.g., centerline 130) and the waveplate line (e.g., line 132) can be made generally parallel in order to facilitate production of the optical integrated circuit, although non-parallel relationships are contemplated as falling within the scope of the invention.

In this regard, an offset distance (e.g., distances 134, 234) on the order of 1 mm provides for adequate reduction in both polarization dependent wavelength shifting and back-reflection for a generally straight waveplate. Thus, although a somewhat curvilinear waveplate line (e.g., lines 132, 232) may theoretically provide intersections exactly equally spaced from the waveguide centerline (e.g., centerlines 130, 230), the provision of a straight waveplate along a straight waveplate line (e.g., generally parallel with the waveguide centerline and spaced therefrom) has been found to provide adequate performance with respect to reduction or mitigation of polarization dependent wavelength shifting and back-reflection.

Another aspect of the invention provides methodologies for manufacturing an optical integrated circuit, wherein a base is provided having one or more waveguides extending axially between first and second ends with a centerpoint centrally located between the first and second ends. The method further comprises providing a waveplate in the base intersecting the waveguide(s) at an intersection spaced from the waveguide centerpoint.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "with", "has", "having", and variants thereof are used in either the detailed description or the claims, these terms are intended to be inclusive in a manner similar to the term "comprising."

What is claimed is:

1. An optical integrated circuit, comprising:
   at least one waveguide extending axially between first and second ends, each waveguide having a centerpoint centrally located between the first and second ends, the at least one waveguide comprising a first portion between the first end and the centerpoint and a second portion between the second end and the centerpoint;
   a second waveguide extending axially between first and second ends and having a centerpoint centrally located on the second waveguide between the first and second ends, the second waveguide comprising a first portion between the first end and the centerpoint and a second portion between the second end and the centerpoint;
   a waveplate intersecting the at least one waveguide at an intersection spaced from the centerpoint, the intersection spaced from the centerpoint of the at least one waveguide by a first distance and the waveplate intersects the second waveguide at an intersection spaced from the centerpoint of the second waveguide by a second distance, the first distance and the second distance are approximately equal, the waveplate intersects the first portions of the waveguides; and
   an input lens providing light to the first ends of the waveguides and an output lens receiving light from the second ends of the waveguides.

2. The optical integrated circuit of claim 1, wherein the waveplate intersects the at least one waveguide at an angle of about 70 degrees or more and less than 90 degrees with respect to the axis of the at least one waveguide.

3. The optical integrated circuit of claim 1, wherein the waveplate comprises a half-wave plate, and the first distance and the second distance are from about 10 microns to about 10 mm.

4. The optical integrated circuit of claim 1, comprising an arrayed-waveguide grating planar lightwave circuit.

5. The optical integrated circuit of claim 1, wherein the intersections of the waveguides are located on curvilinear portions of the waveguides.

6. The optical integrated circuit of claim 1, wherein the waveplate intersects the at least one waveguide at an angle of about 80 degrees or more and about 85 degrees or less with respect to the axis of the at least one waveguide, and wherein the waveplate intersects the second waveguide at an angle of about 80 degrees or more and about 85 degrees or less with respect to the axis of the second waveguide.

7. The optical integrated circuit of claim 1, wherein the waveplate intersects the at least one waveguide at an angle of about 70 degrees or more and less than 90 degrees with respect to the axis of the at least one waveguide, and wherein the waveplate intersects the second waveguide at an angle of about 70 degrees or more and less than 90 degrees with respect to the axis of the second waveguide.

8. The optical integrated circuit of claim 7, wherein the centerpoints of the waveguides are located on a first line, wherein the intersections of the waveplate with the waveguides are located on a second line, and wherein the first and second lines are generally parallel.

9. The optical integrated circuit of claim 8, wherein the at least one waveguide comprises a first portion between the first end and the centerpoint and a second portion between the second end and the centerpoint, wherein the second waveguide comprises a first portion between the first end and the centerpoint and a second portion between the second end and the centerpoint, and wherein the waveplate intersects the first portions of the waveguides.

10. The optical integrated circuit of claim 9, wherein the intersections of the waveguides are located on curvilinear portions of the waveguides.

11. The optical integrated circuit of claim 1, wherein the centerpoints of the waveguides are located on a first line, wherein the intersections of the waveplate with the waveguides are located on a second line, and wherein the first and second lines are generally parallel.

12. An optical integrated circuit, comprising:

at least one waveguide extending axially between first and second ends, each waveguide having a centerpoint centrally located between the first and second ends, the at least one waveguide comprising a first portion between the first end and the centerpoint and a second portion between the second end and the centerpoint;

a second waveguide extending axially between first and second ends and having a centerpoint centrally located on the second waveguide between the first and second ends, the second waveguide comprising a first portion between the first end and the centerpoint and a second portion between the second end and the centerpoint;

a waveplate intersecting the at least one waveguide at an intersection spaced from the centerpoint, the intersection spaced from the centerpoint of the at least one waveguide by a first distance and the waveplate intersects the second waveguide at an intersection spaced from the centerpoint of the second waveguide by a second distance, the first distance and the second distance are approximately equal, the waveplate intersects the second portions of the waveguides; and an input lens providing light to the first ends of the waveguides and an output lens receiving light from the second ends of the waveguides.

13. The optical integrated circuit of claim 12, wherein the waveplate intersects the at least one waveguide at an angle of about 70 degrees or more and less than 90 degrees with respect to the axis of the at least one waveguide, and wherein the waveplate intersects the second waveguide at an angle of about 70 degrees or more and less than 90 degrees with respect to the axis of the second waveguide.

14. The optical integrated circuit of claim 12, wherein the centerpoints of the waveguides are located on a first line, wherein the intersections of the waveplate with the waveguides are located on a second line, and wherein the first and second lines are generally parallel.

15. The optical integrated circuit of claim 12, wherein the waveplate comprises a half-wave plate, and the first distance and the second distance are from about 10 microns to about 10 mm.

16. An arrayed-waveguide grating device, comprising:

a base with a plurality of waveguides extending through the base between an input and an output optical components, the individually having midpoints centrally located between the input and output optical components, the midpoints of the waveguides located along a line, the plurality of waveguides each comprise a first portion between the input optical component and the midpoint and a second portion between the output optical component and the midpoint;

a waveplate spaced apart from and generally parallel to the line and intersecting the plurality of waveguides, the waveplate intersecting either the first portions of the plurality of waveguides or the second portions of the plurality of waveguides, the waveplate operative to reduce polarization dependence of the arrayed-waveguide grating device.

17. The arrayed-waveguide grating device of claim 16, wherein the waveplate intersects the waveguides at intersections at an angle with respect to the waveguides, wherein the angle is about 70 degrees or more and less than 90 degrees to reduce back reflection in the arrayed-waveguide grating device.

18. The arrayed-waveguide grating device of claim 16, wherein the waveplate intersects the waveguides at intersections spaced from the midpoints of the waveguides, and wherein the intersections in each of the waveguides are generally equally spaced from the corresponding midpoints.

19. The arrayed-waveguide grating device of claim 16, wherein the waveplate comprises a half-wave plate, and the first distance and the second distance are from about 10 microns to about 10 mm.

20. A method of manufacturing an optical integrated circuit, comprising:

providing a base having at least a first and a second waveguide extending axially between a first end coupled to an input lens and a second end coupled to an output lens with a centerpoint centrally located between the first and second ends the at least first and second waveguides each comprising a first portion between the first end and the centerpoint and a second portion between the second end and the centerpoint, the centerpoints located along a line; and providing a waveplate in the base intersecting the at least first and second waveguides at an intersection spaced from the centerpoint of the at least first and second waveguides and generally parallel to the line, the waveplate intersecting either the first portions of the waveguides or the second portions of the waveguides.

21. The method of claim 20, wherein providing the waveplate comprises locating the waveplate so as to intersect the at least first and second waveguides at an angle of about 70 degrees or more and less than 90 degrees with respect to the axis of the at least first and second waveguides.

22. The method of claim 20, wherein providing the waveplate comprises locating the waveplate so as to intersect the at least first and second waveguides at an angle of about 80 degrees or more and less than 85 degrees with respect to the axis of the at least first and second waveguides.

* * * * *